United States Patent
Kim et al.

(10) Patent No.: US 10,701,647 B2
(45) Date of Patent: Jun. 30, 2020

(54) OPERATION METHOD OF COMMUNICATION NODE TRANSMITTING SYNCHRONIZATION SIGNAL IN COMMUNICATION NETWORK

(71) Applicant: Electronics and Telecommunications Research Institute, Daejeon (KR)

(72) Inventors: Min Hyun Kim, Busan (KR); Jung Hoon Lee, Daejeon (KR); Sung Hyun Moon, Daejeon (KR); Jun Hwan Lee, Seoul (KR); Ji Hyung Kim, Daejeon (KR); Ju Ho Park, Daejeon (KR); Cheul Soon Kim, Daejeon (KR); Tae Joong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/843,970

(22) Filed: Dec. 15, 2017

(65) Prior Publication Data
US 2018/0279237 A1    Sep. 27, 2018

(30) Foreign Application Priority Data

Mar. 24, 2017 (KR) .................. 10-2017-0037898
Nov. 17, 2017 (KR) .................. 10-2017-0154306

(51) Int. Cl.
*H04W 56/00* (2009.01)
*H04L 27/26* (2006.01)
*H04J 11/00* (2006.01)
*H04W 48/10* (2009.01)

(52) U.S. Cl.
CPC ....... *H04W 56/001* (2013.01); *H04J 11/0069* (2013.01); *H04J 11/0073* (2013.01); *H04L 27/2613* (2013.01); *H04L 27/2626* (2013.01); *H04L 27/2692* (2013.01); *H04J 11/0076* (2013.01); *H04J 2011/0096* (2013.01); *H04W 48/10* (2013.01)

(58) Field of Classification Search
None
See application file for complete search history.

(56) References Cited

U.S. PATENT DOCUMENTS

| | | |
|---|---|---|
| 8,611,314 B2 | 12/2013 | Lee et al. |
| 8,625,526 B2 | 1/2014 | Han et al. |
| 9,144,043 B2 | 9/2015 | Seo et al. |
| 9,144,048 B2 | 9/2015 | Joung et al. |
| 9,350,502 B2 | 5/2016 | Chun et al. |
| 9,438,387 B2 | 9/2016 | Chun et al. |
| 9,497,719 B2 | 11/2016 | You et al. |

(Continued)

*Primary Examiner* — Xavier S Wong
(74) *Attorney, Agent, or Firm* — Rabin & Berdo, P.C.

(57) ABSTRACT

An operation method of a communication node transmitting a synchronization signal in a communication network may comprise generating a synchronization signal block including the synchronization signal; configuring an offset for the synchronization signal block; generating a synchronization signal burst including a plurality of the synchronization signal blocks based on the offset; and transmitting the synchronization signal based on a synchronization signal burst set including the plurality of the synchronization signal blocks. Accordingly, a terminal can dynamically and effectively utilize the plurality of synchronization signal blocks without using additional information.

6 Claims, 10 Drawing Sheets

(56) References Cited

U.S. PATENT DOCUMENTS

| | | | |
|---|---|---|---|
| 2011/0211537 A1* | 9/2011 | Sivanesan | H04L 27/2655 370/329 |
| 2015/0296365 A1* | 10/2015 | Choi | H04W 56/00 370/336 |
| 2016/0205646 A1 | 7/2016 | Chung et al. | |
| 2016/0227502 A1 | 8/2016 | Vos et al. | |
| 2016/0308637 A1 | 10/2016 | Frenne et al. | |
| 2017/0094624 A1 | 3/2017 | Balachandran et al. | |
| 2017/0353912 A1* | 12/2017 | Einhaus | H04W 56/00 |
| 2018/0139036 A1* | 5/2018 | Islam | H04J 1/02 |
| 2018/0212698 A1* | 7/2018 | Sun | H04L 5/0053 |
| 2018/0220360 A1* | 8/2018 | Sheng | H04J 11/0073 |
| 2018/0262313 A1* | 9/2018 | Nam | H04L 5/0053 |
| 2018/0270772 A1* | 9/2018 | Ly | H04L 5/001 |
| 2018/0316464 A1* | 11/2018 | Stern-Berkowitz | H04L 1/0034 |
| 2019/0029003 A1* | 1/2019 | Takeda | H04W 72/04 |

* cited by examiner

400

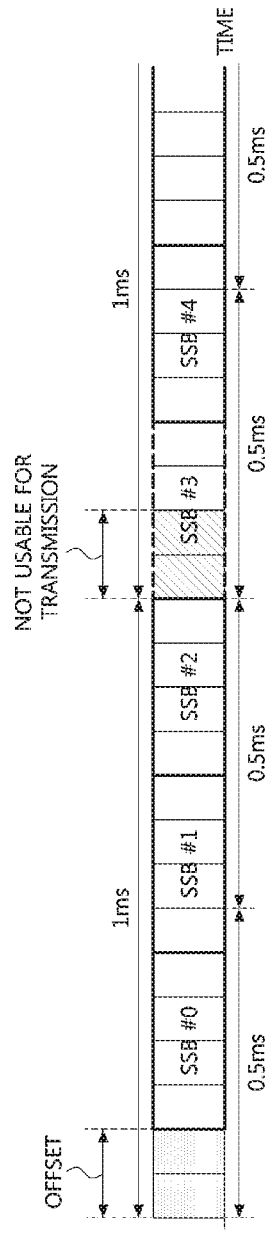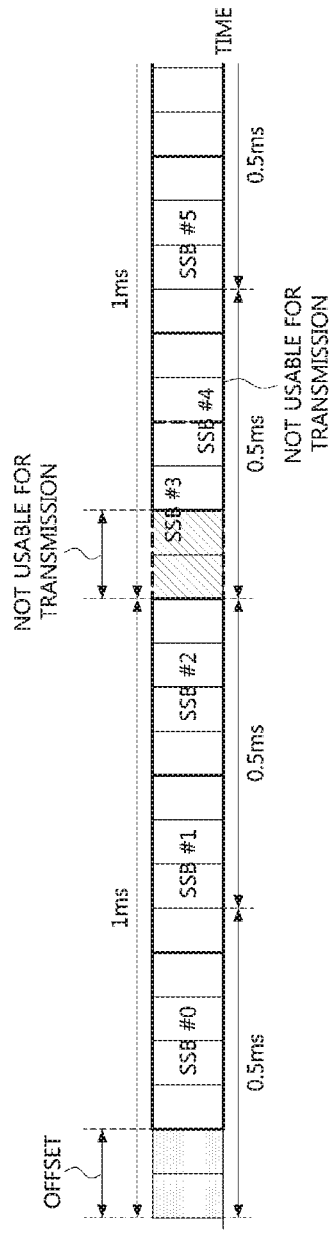

OPERATION METHOD OF COMMUNICATION NODE TRANSMITTING SYNCHRONIZATION SIGNAL IN COMMUNICATION NETWORK

CROSS-REFERENCE TO RELATED APPLICATIONS

This application claims priorities to Korean Patent Applications No. 10-2017-0037898 filed on Mar. 24, 2017 and No. 10-2017-0154306 filed on Nov. 17, 2017 in the Korean Intellectual Property Office (KIPO), the entire contents of which are hereby incorporated by reference.

BACKGROUND

1. Technical Field

The present disclosure relates to an operation method of a communication node transmitting a synchronization signal in a communication network, and more specifically, to an operation method of a communication node which configures a synchronization signal burst set for transmitting a synchronization signal.

2. Related Art

In a communication network, a terminal (e.g., a user equipment (UE)) may generally transmit and receive data through a base station. For example, if there is data to be transmitted to a second terminal, a first terminal may generate a message containing data to be transmitted to the second terminal, and may transmit the generated message to a first base station (e.g., eNB or gNB) to which the first terminal belongs. The first base station may then receive the message from the first terminal, and confirm that the destination of the received message is the second terminal. The first base station may then transmit the message to a second base station to which the second terminal, which is the identified destination, belongs. The second base station may then receive the message from the first base station, and confirm that the destination of the received message is the second terminal. The second base station may then transmit the message to the second terminal which is the identified destination. The second terminal may then receive the message from the second base station, and obtain the data contained in the received message.

Meanwhile, in the communication network, the terminal may obtain downlink related information (e.g., frequency, time synchronization, cell identifier (ID), and the like) based on a synchronization signal periodically transmitted from the base station. Then, the terminal may perform a random access to the base station, and obtain uplink related information. Accordingly, a radio link to the base station may be established. That is, the terminal can access the base station by performing the random access.

As described above, the base station may periodically transmit a synchronization signal so that the terminal can access the base station. Here, the base station may transmit system information for communications with the terminal together with the synchronization signal. For example, the synchronization signal and the system information transmitted from the base station may be transmitted through a synchronization signal block (SSB) defined through a plurality of OFDM symbols together with a physical broadcast channel (PBCH).

When there are a plurality of synchronization signal blocks, the plurality of synchronization signal blocks may constitute a synchronization signal burst, and a plurality of synchronization signal bursts may constitute a synchronization signal burst set. That is, the synchronization signal burst may comprise the plurality of sync signal blocks, and the synchronization signal burst set may comprise the plurality of synchronization signal bursts. Here, the plurality of synchronization signal blocks included in the synchronization signal burst set may be consecutively arranged, but may not necessarily be arranged consecutively. In this case, there is a problem that a method for flexibly utilizing the plurality of synchronization signal blocks included in the synchronization signal burst set is required.

SUMMARY

Accordingly, embodiments of the present disclosure provide an operation method of a communication node which configures a synchronization signal burst set for transmitting a synchronization signal in a communication network.

In order to achieve the objective of the present disclosure, an operation method of a communication node transmitting a synchronization signal in a communication network may comprise generating a synchronization signal block including the synchronization signal; configuring an offset for the synchronization signal block; generating a synchronization signal burst including a plurality of the synchronization signal blocks based on the offset; and transmitting the synchronization signal based on a synchronization signal burst set including the plurality of the synchronization signal blocks.

The synchronization signal may include a primary synchronization signal (PSS) and a secondary synchronization signal (SSS).

The synchronization signal block may comprise a plurality of orthogonal frequency division multiplexing (OFDM) symbols.

The synchronization signal block may comprise the PSS and the SSS included in the synchronization signal, and a physical broadcast channel (PBCH) of the communication network.

In the configuring an offset, the offset may be configured as one of a number of OFDM symbols, a time, and a number of synchronization signal blocks.

In the configuring an offset, the offset may be configured as a common offset commonly applied to the synchronization signal burst set including the plurality of synchronization signal blocks.

In the configuring an offset, the offset may be configured as a synchronization signal block group specific offset applied to a synchronization signal block group including a predetermined number of synchronization signal blocks among the plurality of synchronization signal blocks.

In the configuring an offset, the offset may be configured as a synchronization signal block specific offset applied to a predetermined synchronization signal block among the plurality of synchronization signal blocks.

Information on the offset may be transmitted as included in the SSS of the synchronization signal or through the PBCH transmitted through the synchronization signal block including the synchronization signal.

The communication node may be a base station transmitting the synchronization signal in the communication network.

In order to achieve the objective of the present disclosure, a communication node transmitting a synchronization signal in a communication network may comprise a processor and a memory storing at least one instruction executed by the processor. Also, the at least one instruction may be configured to generate a synchronization signal block including the synchronization signal; configure an offset for the synchronization signal block; generate a synchronization signal burst including a plurality of the synchronization signal blocks based on the offset; and transmit the synchronization signal based on a synchronization signal burst set including the plurality of the synchronization signal blocks.

The synchronization signal may include a primary synchronization signal (PSS) and a secondary synchronization signal (SSS).

The synchronization signal block may comprise a plurality of orthogonal frequency division multiplexing (OFDM) symbols.

The synchronization signal block may comprise the PSS and the SSS included in the synchronization signal, and a physical broadcast channel (PBCH) of the communication network.

The at least one instruction may be further configure to set the offset to be one of a number of OFDM symbols, a time, and a number of synchronization signal blocks.

The at least one instruction may be further configured to set the offset to be a common offset commonly applied to the synchronization signal burst set including the plurality of synchronization signal blocks.

The at least one instruction may be further configured to set the offset to be a synchronization signal block group specific offset applied to a synchronization signal block group including a predetermined number of synchronization signal blocks among the plurality of synchronization signal blocks.

The at least one instruction may be further configured to set the offset to be a synchronization signal block specific offset applied to a predetermined synchronization signal block among the plurality of synchronization signal blocks.

Information on the offset may be transmitted as included in the SSS of the synchronization signal or through the PBCH transmitted through the synchronization signal block including the synchronization signal.

The communication node may be a base station transmitting the synchronization signal in the communication network.

Using the above-described embodiments according to the present disclosure, a plurality of synchronization signal blocks included in a synchronization signal burst set transmitted in a communication network can be easily distinguished. Accordingly, a terminal can dynamically and effectively utilize the plurality of synchronization signal blocks without using additional information.

BRIEF DESCRIPTION OF DRAWINGS

Embodiments of the present disclosure will become more apparent by describing in detail embodiments of the present disclosure with reference to the accompanying drawings, in which:

FIG. 10 is a conceptual diagram illustrating an example of a synchronization signal burst set to which a common offset is applied in a communication network according to an embodiment of the present disclosure;

FIG. 11 is a conceptual diagram illustrating an example of a synchronization signal burst set to which a synchronization signal block group specific offset is applied in a communication network according to an embodiment of the present disclosure;

DETAILED DESCRIPTION

Figure 1:
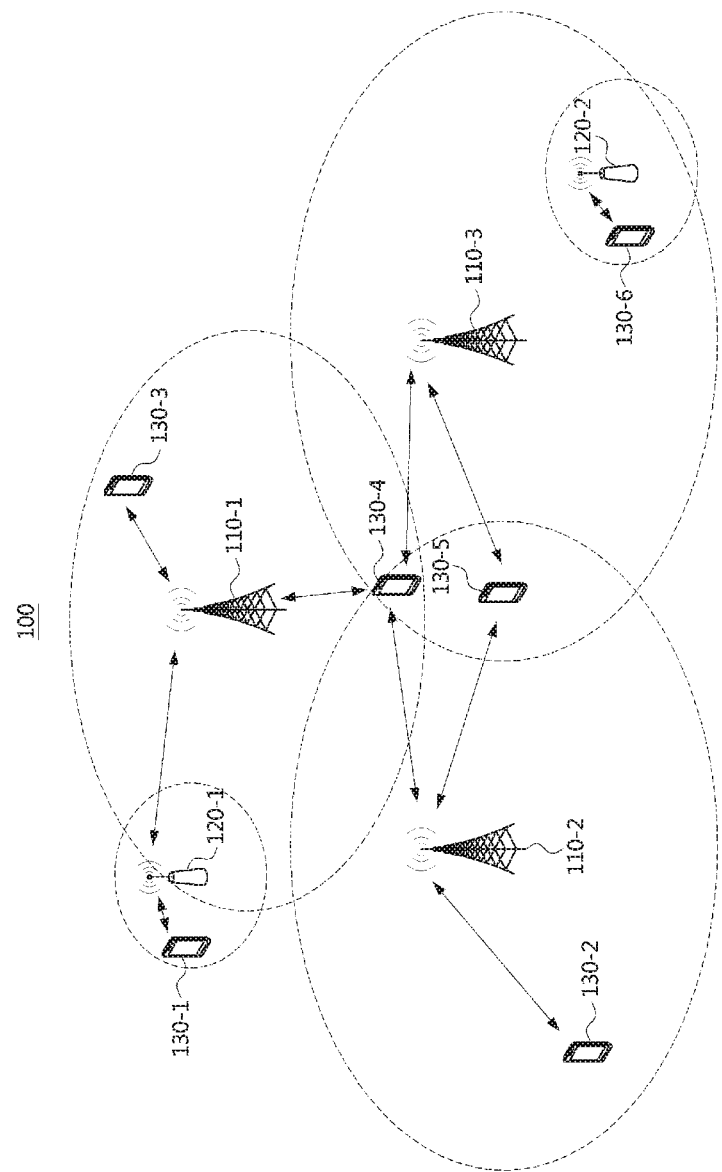
FIG. 1 is a conceptual diagram illustrating a first embodiment of a cellular communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which exemplary embodiments according to the present disclosure will be described. However, wireless communication networks to which exemplary embodiments according to the present disclosure are applied are not restricted to what will be described below. That is, exemplary embodiments according to the present disclosure may be applied to various wireless communication networks.

FIG. 1 is a conceptual diagram illustrating a first embodiment of a cellular communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may comprise a core network (e.g., a serving gateway (S-GW), a packet data network (PDN) gateway (P-GW), a mobility management entity (MME), and the like).

The plurality of communication nodes may support $4^{th}$ generation (4G) communication (e.g., long term evolution (LTE), LTE-advanced (LTE-A)), or $5^{th}$ generation (5G) communication defined in the $3^{rd}$ generation partnership project (3GPP) standard. The 4G communication may be performed in a frequency band below 6 gigahertz (GHz), and the 5G communication may be performed in a frequency band above 6 GHz. For example, for the 4G and 5G communications, the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the plurality of communication nodes may have the following structure.

Figure 2:
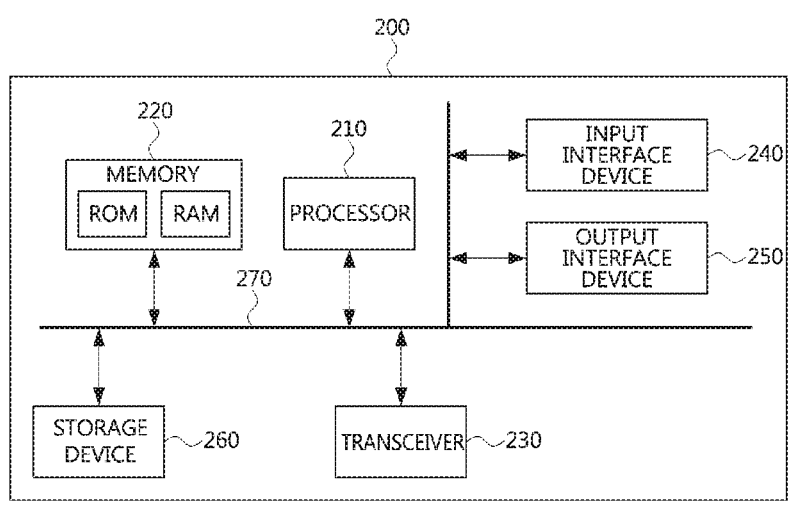
FIG. 2 is a block diagram illustrating a first embodiment of a communication node constituting a cellular communication system.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support downlink transmission based on orthogonal frequency division multiple access (OFDMA), and uplink transmission based on single-carrier frequency division multiple access (SC-FDMA). Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner. The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication system may support three types of frame structures. A type 1 frame may be applied to a communication system based on frequency division duplexing (FDD), a type 2 frame may be applied to a communication system based on time division duplexing (TDD), and a type 3 frame may be applied to a unlicensed band based communication system (e.g., a licensed assisted access (LAA) based communication system).

Figure 3:
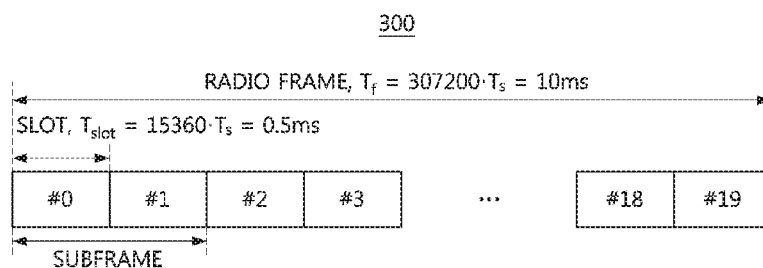
FIG. 3 is a conceptual diagram illustrating a first embodiment of a type 1 frame.

FIG. 3 is a conceptual diagram illustrating a first embodiment of a type 1 frame.

Referring to FIG. 3, a radio frame 300 may comprise 10 subframes, and a subframe may comprise 2 slots. Thus, the radio frame 600 may comprise 20 slots (e.g., slot #0, slot #1, slot #2, slot #3, . . . , slot #18, and slot #19). The length of the radio frame ($T_f$) 300 may be 10 milliseconds (ms). The length of the subframe may be 1 ms, and the length of a slot ($T_{slot}$) may be 0.5 ms. Here, $T_s$ may be 1/30,720,000s.

The slot may be composed of a plurality of OFDM symbols in the time domain, and may be composed of a plurality of resource blocks (RBs) in the frequency domain. The RB may be composed of a plurality of subcarriers in the frequency domain. The number of OFDM symbols constituting the slot may vary depending on the configuration of a cyclic prefix (CP). The CP may be classified into a normal CP and an extended CP. If the normal CP is used, the slot may be composed of 7 OFDM symbols, in which case the subframe may be composed of 14 OFDM symbols. If the extended CP is used, the slot may be composed of 6 OFDM symbols, in which case the subframe may be composed of 12 OFDM symbols.

Figure 4:
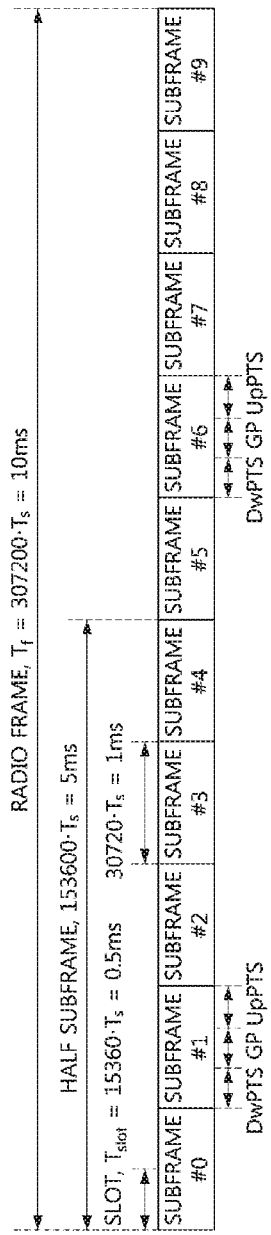
FIG. 4 is a conceptual diagram illustrating a first embodiment of a type 2 frame.

FIG. 4 is a conceptual diagram illustrating a first embodiment of a type 2 frame.

Referring to FIG. 4, a radio frame 400 may comprise two half frames, and a half frame may comprise 5 subframes. Thus, the radio frame 400 may comprise 10 subframes. The length ($T_f$) of the radio frame 400 may be 10 ms. The length of the half frame may be 5 ms. The length of the subframe may be 1 ms. Here, $T_s$ may be 1/30,720,000s.

The radio frame 400 may include at least one downlink subframe, at least one uplink subframe, and a least one special subframe. Each of the downlink subframe and the uplink subframe may include two slots. The length of a slot $T_{slot}$ may be 0.5 ms. Among the subframes included in the radio frame 400, each of the subframe #1 and the subframe #6 may be a special subframe. The special subframe may include a downlink pilot time slot (DwPTS), a guard period (GP), and an uplink pilot time slot (UpPTS).

The DwPTS may be regarded as a downlink interval and may be used for cell search, time and frequency synchronization acquisition of the terminal, and the like. The GP may be used for resolving interference problems of uplink data transmission caused by delay of downlink data reception. Also, the GP may include a time required for switching from the downlink data reception operation to the uplink data transmission operation. The UpPTS may be used for uplink channel estimation, time and frequency synchronization acquisition, and the like.

The lengths of the DwPTS, the GP, and the UpPTS included in the special subframe may be variably adjusted as needed. In addition, the number and position of each of the downlink subframe, the uplink subframe, and the special subframe included in the radio frame 400 may be changed as needed.

Figure 5:
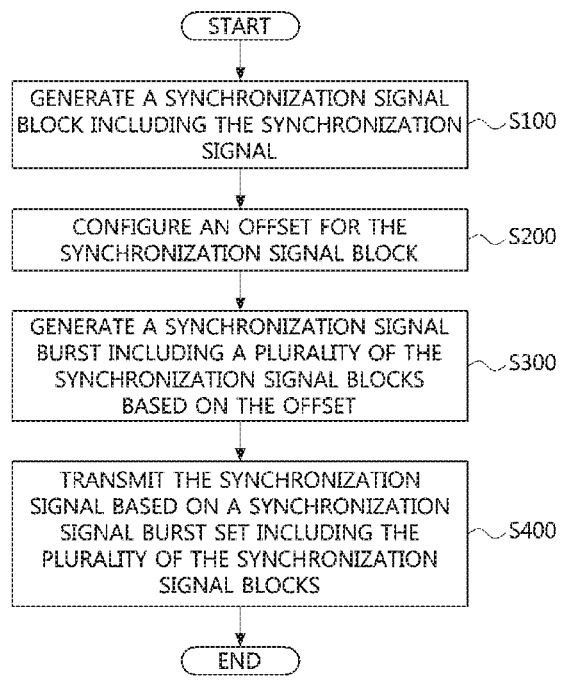
FIG. 5 is a flowchart for explaining an operation method of a communication node for transmitting a synchronization signal in a communication network according to an embodiment of the present disclosure.

FIG. 5 is a flowchart for explaining an operation method of a communication node for transmitting a synchronization signal in a communication network according to an embodiment of the present disclosure.

Referring to FIG. 5, an operation method of a communication node for transmitting a synchronization signal may be performed in the communication node described with reference to FIGS. 1 and 2. In particular, the communication node performing the operation method according to embodiments of the present disclosure may be the base station among the communication nodes explained with reference to FIG. 1.

Specifically, in a communication network, a communication node may generate a synchronization signal block (hereinafter, simply referred to as 'SSB') including a synchronization signal (S100). The synchronization signal of the communication node may include a primary synchronization signal (PSS) and a secondary synchronization signal (SSS). The SSB including the synchronization signal may be composed of a plurality of OFDM symbols corresponding to a predetermined number. Also, the SSB including the synchronization signal of the communication node may be composed of the PSS and SSS included in the synchronization signal, and a physical broadcast channel (PBCH) of the communication network.

Thereafter, the communication node may configure an offset for the SSB (S200). Specifically, the communication node may configure one of the number of OFDMA symbols, a time, and the number of SSBs which indicate an offset for the plurality of SSBs. Through this, the communication node may configure the offset for the plurality of SSBs based on a predetermined scheme.

For example, the communication node may configure a common offset commonly applied to a synchronization signal burst set (hereinafter, simply referred to as 'SSBS') including the plurality of SSBs. In addition, the communication node may set a synchronization signal block group specific offset applied to a synchronization signal block group (hereinafter, simply referred to as 'SSBG') including a predetermined number of SSBs among the plurality of SSBs. Also, the communication node may configure a synchronization block specific offset to be applied to a predetermined SSB among the plurality of SSBs.

As described above, information about the offset configured at the communication node may be transmitted together in the process of transmitting the synchronization signal. For example, the information about the offset configured at the communication node may be transmitted as included in the SSS of the synchronization signal, or may be transmitted through the PBCH through which the SSB including the synchronization signal is transmitted.

Thereafter, the communication node may generate a synchronization signal burst including the plurality of SSBs based on the offset (S300). That is, the communication node may generate the plurality of SSBs including the synchronization signal. Thereafter, the communication node may generate the synchronization signal burst including the plurality of generated SSBs.

Thereafter, the communication node may transmit the synchronization signal based on the SSBS including the synchronization signal bursts (S400). Specifically, the communication node may generate the SSBS comprising the plurality of synchronization signal bursts. Then, the communication node may transmit the synchronization signal by transmitting the generated SSBS.

In this manner, the communication node according to an embodiment of the present disclosure can transmit the synchronization signal. The SSB, the synchronization signal burst, and the SSBS described with reference to FIG. 5 may be specifically described below with reference to FIG. 6.

Figure 6:
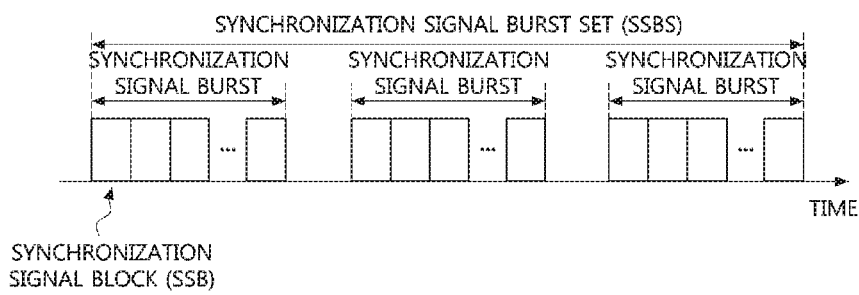
FIG. 6 is a conceptual diagram illustrating a synchronization signal burst set through which synchronization signals are transmitted in a communication network according to an embodiment of the present disclosure.

FIG. 6 is a conceptual diagram illustrating a synchronization signal burst set through which synchronization signals are transmitted in a communication network according to an embodiment of the present disclosure.

Referring to FIG. 6, a SSBS through which synchronization signals are transmitted may include a plurality of synchronization signal bursts. Also, each of the plurality of synchronization signal bursts may include a plurality of SSBs. Further, each of the plurality of SSBs may include a synchronization signal of the communication node.

The plurality of synchronization signal bursts and the plurality of SSBs included in the SSBS may be consecutively arranged in time. On the other hand, the plurality of synchronization signal bursts and the plurality of SSBs included in the SSBS may be non-consecutively arranged in time. Also, the plurality of SSBs included in the SSBS may be grouped into at least one SSBG (in a form of a synchronization signal burst in FIG. 6) including SSBs corresponding to a predetermined number as shown in FIG. 6.

In a communication network according to an embodiment of the present disclosure, it may be assumed that the plurality of SSBs are consecutively arranged in time. In other words, the plurality of SSBs included in the SSBS in the communication network according to an embodiment of the present disclosure may be described as being assumed to be configured based on a plurality of consecutive OFDM symbols in time.

Hereinafter, a specific method in which the synchronization signal block, the synchronization signal burst, and the synchronization signal burst set described with reference to FIG. 6 are configured in the communication network according to an embodiment of the present disclosure will be described with reference to FIGS. 7 to 9.

Figure 7:
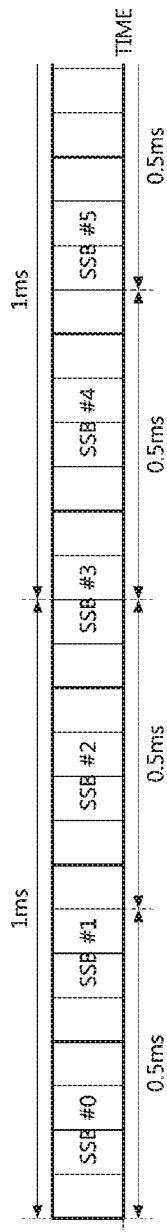
FIG. 7 is a conceptual diagram illustrating a first embodiment of a plurality of synchronization signal blocks included in a synchronization signal burst set in a communication network according to an embodiment of the present disclosure.
Figure 8:
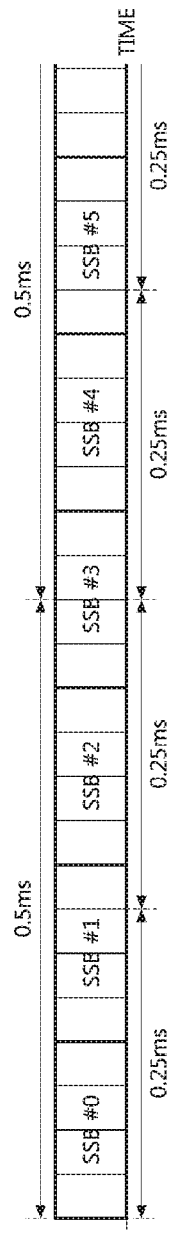
FIG. 8 is a conceptual diagram illustrating a second embodiment of a plurality of synchronization signal blocks included in a synchronization signal burst set in a communication network according to an embodiment of the present disclosure.
Figure 9:
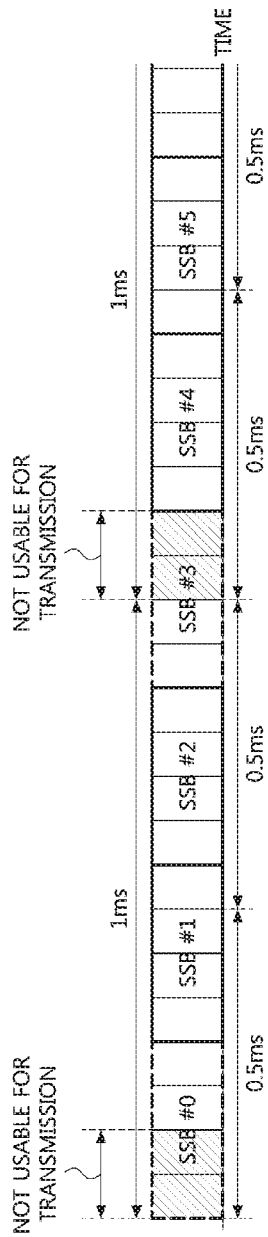
FIG. 9 is a conceptual diagram illustrating a third embodiment of a plurality of synchronization signal blocks included in a synchronization signal burst set in a communication network according to an embodiment of the present disclosure.

FIG. 7 is a conceptual diagram illustrating a first embodiment of a plurality of synchronization signal blocks included in a synchronization signal burst set in a communication network according to an embodiment of the present disclosure, FIG. 8 is a conceptual diagram illustrating a second embodiment of a plurality of synchronization signal blocks included in a synchronization signal burst set in a communication network according to an embodiment of the present disclosure, and FIG. 9 is a conceptual diagram illustrating a third embodiment of a plurality of synchronization signal blocks included in a synchronization signal burst set in a communication network according to an embodiment of the present disclosure.

First, referring to FIGS. 7 and 8, a structure of a SSBS in a communication network according to an embodiment of the present disclosure may vary according to the number of OFDM symbols constituting a SSB and an interval between subcarriers (i.e., subcarrier spacing) of the communication network. That is, in case that a SSBS is configured through one radio frame, the number of SSBs included in the radio frame may vary according to the number of OFDM symbols constituting the SSB and the subcarrier spacing of the communication network.

For example, in FIG. 7, it may be assumed that the SSB is composed of 4 OFDM symbols and the subcarrier spacing is 15 kHz. In such the case, when a SSBS is configured through one radio frame, the radio frame may include 35 SSBs. On the other hand, in FIG. 8, it may be assumed that the SSB is also composed of 4 OFDM symbols and the subcarrier spacing is 30 kHz. In such the case, when a SSBS is configured through one radio frame, the radio frame may include 70 SSBs. The SSBS according to an embodiment of the present disclosure described below may be described as including a plurality of SSBs constituted by consecutive OFDM symbols in a radio frame as described with reference to FIGS. 7 and 8. In particular, the SSBS according to an embodiment of the present disclosure described below may be configured as a SSBS through one radio frame, and a SSB may comprise 4 OFDM symbols, as described with reference to FIG. 7.

Referring to FIG. 9, a communication network according to an embodiment of the present disclosure may be a communication network supporting LTE. Specifically, information related to control signaling may be transmitted in a first OFDM symbol and a second OFDM symbol in a subframe of LTE. For example, a first OFDM symbol and a second OFDM symbol in a first subframe and a first OFDM symbol and a second OFDM symbol in a second subframe in FIG. 9 may be transmitted with the information related to control signaling.

Accordingly, among the plurality of SSBs included in the SSBS, the information related to control signaling may be transmitted through a first OFDM symbol and a second OFDM symbol constituting a SSB #0. Also, among the plurality of SSBs included in the SSBS, the information related to control signaling may be transmitted in a third OFDM symbol and a fourth OFDM symbol constituting a SSB #3.

Therefore, the SSB #0 of the SSBS may not use the first OFDM symbol and the second OFDM symbol among 4 OFDM symbols, and the SSB #3 may not use the third OFDM Symbol and the fourth OFDM symbol among 4 OFDM symbols. That is, the SSB #0 and the SSB #3 of the SSBS may be SSBs that cannot be used even though they are transmitted. In FIG. 9, it is shown that the transmission of the SSB #0 and the SSB #3 is impossible, but this may mean that the SSB #0 and the SSB #3 cannot be used for transmission of synchronization signals even though they are transmitted.

As described above, SSBs which cannot be used for transmission of synchronization signals among the plurality of SSBs included in the SSBS transmitted in the communication network may occur. Thus, a method, in which an offset is applied to the plurality of SSBs so that the SSBs which cannot be used can be made usable, may be proposed. Hereinafter, the method of applying an offset to the plurality of SSBs included in the SSBS will be described in detail with reference to FIGS. 10 to 12.

Figure 12:
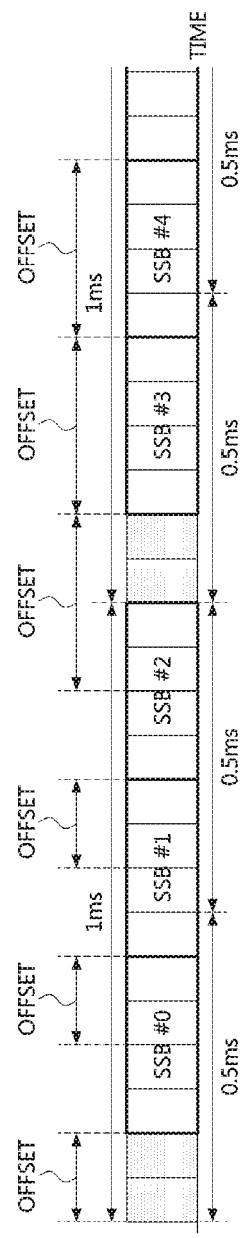
FIG. 12 is a conceptual diagram illustrating an example of a synchronization signal burst set to which a synchronization signal block specific offset is applied in a communication network according to an embodiment of the present disclosure.

FIG. 10 is a conceptual diagram illustrating an example of a synchronization signal burst set to which a common offset is applied in a communication network according to an embodiment of the present disclosure, FIG. 11 is a conceptual diagram illustrating an example of a synchronization signal burst set to which a synchronization signal block group specific offset is applied in a communication network according to an embodiment of the present disclosure, and FIG. 12 is a conceptual diagram illustrating an example of a synchronization signal burst set to which a synchronization signal block specific offset is applied in a communication network according to an embodiment of the present disclosure.

Referring to FIGS. 10 to 12, as an offset for SSBs of a SSBS in a communication network according to an embodiment of the present disclosure, one of the number of OFDM symbols to which the offset is applied, the time corresponding to the offset, and the number of SSBs to which the offset is applied may be configured. In FIGS. 10 to 12, it may be assumed that the number of OFDM symbols to which the offset is applied is configured.

Referring to FIG. 10, in a communication network according to an embodiment of the present disclosure, a common offset commonly applied to the SSBS including the plurality of SSBs may be configured. For example, the common offset applied to the SSBS including the plurality of SSBs may be configured to be an offset corresponding to two OFDM symbols.

In this case, the plurality of SSBs included in the SSBS may be configured based on the applied offset. Specifically, the plurality of SSBs may be configured based on remaining OFDM symbols except a first OFDM symbol and a second OFDM symbol among the plurality of OFDM symbols constituting the SSBS. That is, the plurality of SSBs may be configured based on the remaining OFDM symbols except the first OFDM symbol and the second OFDM symbol among a plurality of OFDM symbols (i.e., 14 OFDM symbols) constituting a subframe.

Accordingly, SSBs #0 to #4 may be configured based on OFDM symbols located after the first and second OFDM symbols among the plurality of OFDM symbols constituting the subframe. On the other hand, the SSB #3 may be included in a subframe other than the subframe including the SSBs #0 to #2. Therefore, a first OFDM symbol and a second OFDM symbol constituting the SSB #3 may overlap with OFDM symbols of the subframe through which the information related to control signaling is transmitted. Therefore, when the common offset is applied to the SSBS, the SSB #0 among the plurality of SSBs may be usable, but the SSB #3 may not be usable.

Referring to FIG. 11, in a communication network according to an embodiment of the present disclosure, a SSBG specific offset applied to a SSBG including a predetermined number of SSBs among the plurality of SSBs may be configured. For example, if the predetermined number is 4, the SSBG may include 4 SSBs. That is, a first SSBG may include a SSB #0, a SSB #1, a SSB #2, and a SSB #3. Also, a second SSBG may include a SSB #4, a SSB #5, a SSB #6, and a SSB #7. Here, the SSB #6 and the SSB #7 are omitted in FIG. 11. In this case, the SSBG specific offset may be assumed to be an offset corresponding to two OFDM symbols for each of the first SSBG and the second SSBG.

In this case, the plurality of SSBs included in the first SSBG of the SSBS may be configured based on the applied offset. Specifically, the SSB #0, the SSB #1, the SSB #2, and the SSB #3 included in the first SSBG may be configured based on OFDM symbols except the first OFDM symbol and the second OFDM symbol among the plurality of OFDM symbols constituting the SSBS. That is, the plurality of SSBs included in the first SSBG may be configured based OFDM symbols except the first OFDM symbol and the second OFDM symbol among the plurality of OFDM symbols (i.e., 14 OFDM symbols) constituting a subframe. Here, the SSB #3 may be included in a subframe other than the subframe including the SSBs #0 to #2. Therefore, the first OFDM symbol and the second OFDM symbol constituting the SSB #3 may overlap with the OFDM symbols of the subframe through which the information related to control signaling is transmitted.

Also, the SSB #4, the SSB #5, the SSB #6, and the SSB #7 included in the second SSBG may be configured based on OFDM symbols except the first OFDM symbol and the second OFDM symbol among the plurality of OFDM symbols constituting the SSBS. That is, the plurality of SSBs included in the first SSBG may be configured based OFDM symbols except the first OFDM symbol and the second OFDM symbol among the plurality of OFDM symbols (i.e., 14 OFDM symbols) constituting a subframe. Here, the SSB #7 may be included in a subframe other than the subframe including the SSBs #4 to #6. Therefore, although not depicted in FIG. 11, the first OFDM symbol and the second OFDM symbol constituting the SSB #7 may overlap with the OFDM symbols of the subframe through which the information related to control signaling is transmitted.

Therefore, when applying the SSBG specific offset to each SSBG included in the SSBS, the SSB #0 among the plurality of SSBs may be usable, but the SSB #3 may not be usable.

Referring to FIG. 12, a SSB specific offset applied to a predetermined SSB among a plurality of SSBs in a communication network according to an embodiment of the present disclosure may be configured. For example, the SSB specific offset may be configured for each of the SSB #0, the SSB #1, the SSB #2, the SSB #3, and the SSB #4 included in the SSBS.

In this case, each of the SSB #0, the SSB #1, the SSB #2, the SSB #3, and the SSB #4 included in the SSBS may be configured based on the applied offset. Specifically, an offset corresponding to two OFDM symbols may be configured for the SSBs #0 to #2. That is, the SSBs #0 to #2 may be configured based on OFDM symbols except a first OFDM symbol and a second OFDM symbol among the plurality of OFDM symbols (i.e., 14 OFDM symbols) constituting a subframe.

Also, an offset corresponding to four OFDM symbols may be configured for the SSBs #3 to #4. In other words, the SSBs #3 to #4 may be configured based on OFDM symbols except the first OFDM symbol and the second OFDM symbol among the plurality of OFDM symbols (i.e., 14 OFDM symbols) constituting a subframe.

Therefore, when the SSB specific offset is applied to each of SSBs among the plurality of SSBs included in the SSBS, the SSBs #0 to #4 may be all usable.

Hereinafter, a method of transmitting a synchronization signal when a data region and a synchronization signal burst set region, which have different subcarrier spacing, coexist in a communication network will be described with reference to FIGS. 13 and 14.

Figure 13:
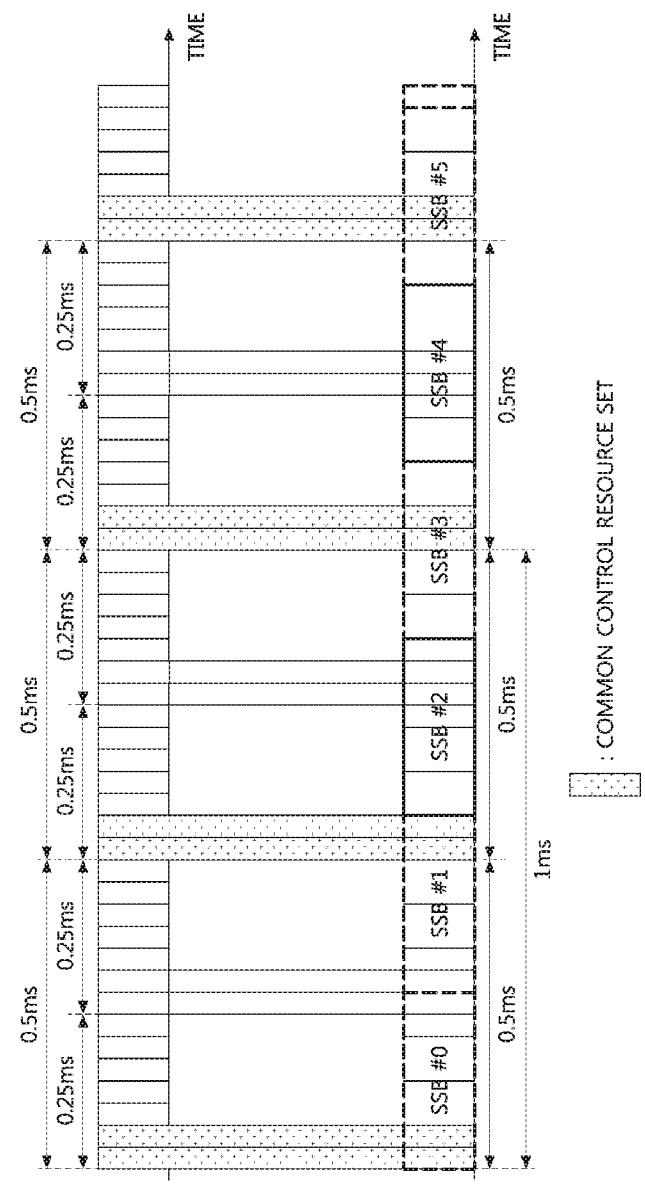
FIG. 13 is a conceptual diagram illustrating a first embodiment of a data region and a SSBS region in a communication network according to an embodiment of the present disclosure.
Figure 14:
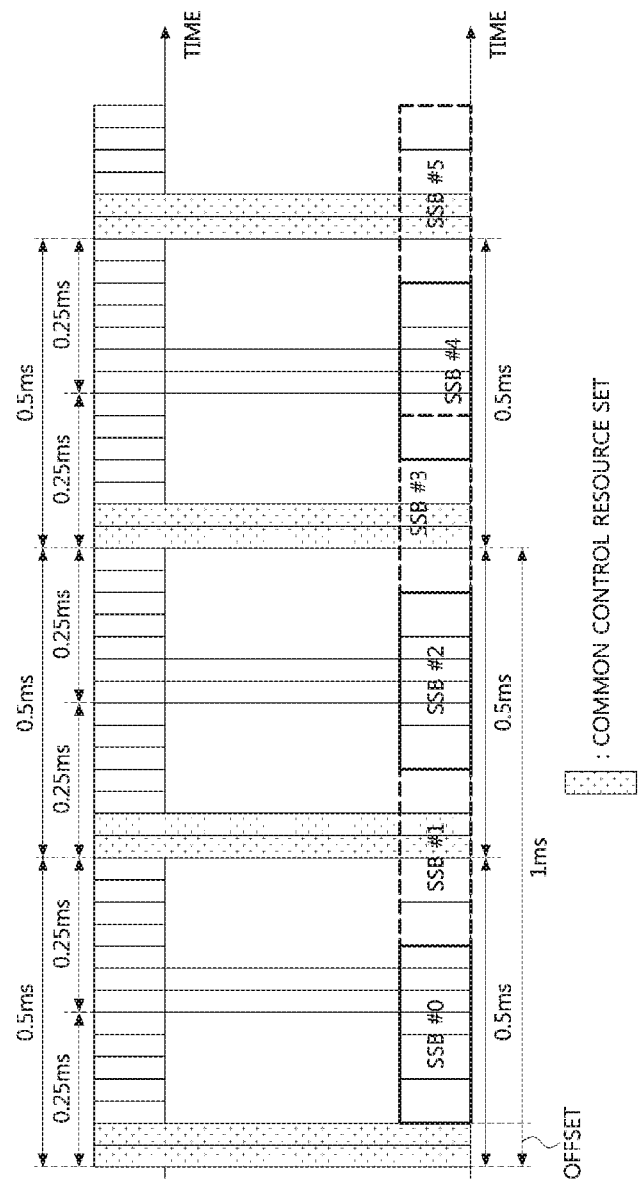
FIG. 14 is a conceptual diagram illustrating a second embodiment of a data region and a SSBS region in a communication network according to an embodiment of the present disclosure.

FIG. 13 is a conceptual diagram illustrating a first embodiment of a data region and a SSBS region in a communication network according to an embodiment of the present disclosure, and FIG. 14 is a conceptual diagram illustrating a second embodiment of a data region and a SSBS region in a communication network according to an embodiment of the present disclosure.

Referring to FIGS. 13 and 14, it may be assumed that a data region having a subcarrier spacing of 30 kHz and a SSBS region having a subcarrier spacing of 15 kHz coexist in a communication network according to an embodiment of the present disclosure. First, referring to FIG. 13, in the data region having the subcarrier spacing of 30 kHz, OFDM symbols through which a common control resource set (hereinafter, simply referred to as 'CCRS') is transmitted may be overlapped with a part of a plurality of OFDM symbols constituting SSBs.

Specifically, the SSB #0, the SSB #1, the SSB #3, and the SSB #5 may be overlapped with the region through which the CCRS is transmitted in the data region having the subcarrier spacing of 30 kHz. Accordingly, the SSB #0, the SSB #1, the SSB #3, and the SSB #5 may not be usable. Here, the SSB #2 and the SSB #4 may not be overlapped with the region through which the CCRS is transmitted in the data region having the subcarrier spacing of 30 kHz. Accordingly, the SSB #2 and the SSB #4 may be usable.

Meanwhile, referring to FIG. 14, the SSBG specific offset described with reference to FIG. 11 in the communication network described with reference to FIG. 13 may be applied. For example, in case that the number of the SSBs included in the SSBG is preset to four, the SSBG may include four SSBs. That is, a first SSBG may include the SSB #0, the SSB #1, the SSB #2, and the SSB #3. Also, a second SSBG may include the SSB #4, the SSB #5, the SSB #6, and the SSB #7. Here, the SSB #6 and the SSB #7 are omitted in FIG. 14. In this case, the SSBG specific offset may be assumed to be an offset corresponding to two OFDM symbols for the first SSBG.

In this case, the SSBs #0 to #3 included in the first SSBG may be configured based on OFDM symbols except a first OFDM symbol and a second OFDM symbol in a subframe. Accordingly, the SSB #0 and the SSB #2 included in the first SSBG may not be overlapped with the region through which the CCRS is transmitted in the data region having the subcarrier spacing of 30 kHz. Accordingly, the SSB #0 and the SSB #2 included in the first SSBG may be usable.

On the other hand, the SSB #4 included in the second SSBG may not be overlapped with the region through which the CCRS is transmitted in the data region having the subcarrier spacing of 30 kHz. Accordingly, the SSB #4 included in the second SSBG may be usable. On the other hand, the SSB #5 included in the second SSBG may be overlapped with the region through which the CCRS is transmitted in the data region having the subcarrier spacing of 30 kHz, and thus may not be usable.

As described with reference to FIGS. 10 to 14, an operation method of a communication node for transmitting a synchronization signal in a communication network according to an embodiment of the present disclosure may apply an offset to a SSBG, and transmit synchronization signals based on the SSBG to which the offset is applied.

As described above, the synchronization signal burst for transmission of synchronization signals may be transmitted based on a preset cycle. For example, in the communication network, the base station may periodically transmit the synchronization signal burst including synchronization signals for accessing of terminals based on the preset cycle. Here, the base station in the communication network may change the transmission cycle of the synchronization signal burst as needed. As described above, a method for the base station to change the transmission cycle of the synchronization signal burst in the communication network may be described in detail with reference to FIG. 15 below.

Figure 15:
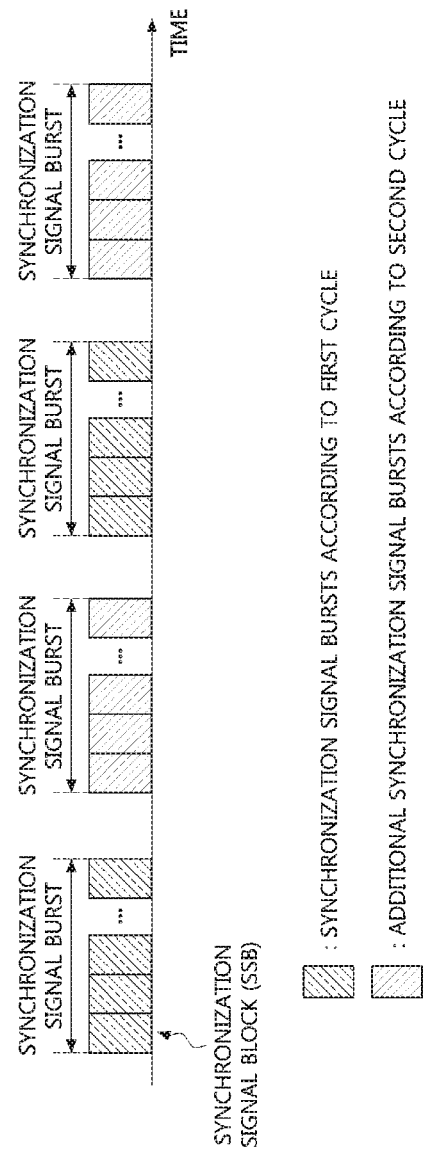
FIG. 15 is a conceptual diagram illustrating an example of a transmission cycle of a synchronization signal burst in a communication network according to an embodiment of the present disclosure.

FIG. 15 is a conceptual diagram illustrating an example of a transmission cycle of a synchronization signal burst in a communication network according to an embodiment of the present disclosure.

Referring to FIG. 15, a base station may transmit synchronization signal bursts based on a first cycle. Also, the base station may change the transmission cycle of synchronization signal bursts as needed. For example, the base station may change the transmission cycle of the synchronization signal bursts to a second cycle corresponding to half of the first cycle. Accordingly, additional synchronization signal bursts may be transmitted between the synchronization signal bursts transmitted based on the first cycle.

Here, in order for the terminal to distinguish the synchronization signal bursts according to the first cycle and the additional synchronization signal bursts according to the second cycle, the base station may configure different cell IDs to the synchronization signal bursts according to the first cycle and the additional synchronization signal bursts according to the second cycle. Accordingly, the terminal receiving the synchronization signal bursts transmitted from the base station may distinguish each of the synchronization signal bursts according to the first cycle and the additional synchronization signal bursts according to the second cycle based on different cell IDs.

Also, the base station may transmit only the SSS as the synchronization signal included in the additional synchronization signal bursts according to the second cycle so that the terminal can distinguish the synchronization signals burst according to the first cycle and the additional synchronization signal bursts according to the second cycle. Accordingly, when only the PSS included in the synchronization signal may be used to acquire time synchronization, the terminal can distinguish the synchronization signal bursts according to the first cycle and the additional synchronization signal bursts according to the second cycle.

Also, the base station may generate the synchronization signal bursts according to the first cycle and the additional second synchronization signal bursts according to the second cycle including indicators capable of distinguishing the synchronization signal bursts according to the first cycle and the additional synchronization signal bursts according to the second cycle at the terminal. For example, the base station may generate the synchronization signal bursts according to the first cycle and the additional synchronization signal bursts according to the second cycle including indicators each of which has a size of 1 bit so as to distinguish whether the transmission cycle of the corresponding synchronization signal burst is the first cycle or the second cycle. Accordingly, the terminal may identify each of the synchronization signal bursts according to the first cycle and the additional synchronization signal bursts according to the second cycle by checking the indicator included in each of the synchronization signal bursts received from the base station.

Also, the base station may transmit information on time indexes indicating synchronization signal bursts to the terminal in advance, and based on the information, the terminal may selectively use the synchronization signal bursts according to the first cycle and the additional synchronization signal bursts according to the second cycle. That is, in case that the terminal has acquired the information on the time index from the base station in advance, the terminal may acquire the synchronization signal regardless of the transmission cycle of the synchronization signal bursts, and may perform random access to the base station through the acquired synchronization signal.

In FIG. 15, examples of the transmission cycle of the synchronization signal bursts have been described, but embodiments of the present disclosure are not limited thereto. That is, the operation method of the base station according to the transmission cycle of the synchronization signal bursts described with reference to FIG. 15 may be similarly applied to the operation method of the base station according to the transmission cycle of the synchronization signal burst sets.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a communication node transmitting a synchronization signal in a communication network, the operation method comprising:
    configuring time offset information indicating a time location during which a first synchronization signal block (SSB) is transmitted, the time location indicating a location from a starting point of a frame in which the first SSB is transmitted;
    generating the first SSB including a primary synchronization signal (PSS), a secondary synchronization signal (SSS), and a physical broadcast channel (PBCH), the PBCH including the time offset information;
    generating one or more SSBs including the first SSB; and
    transmitting the one or more SSBs according to the time offset information,
    wherein the time offset information is configured as a common offset commonly applied to the one or more SSBs.

2. The operation method according to claim 1, wherein the time offset information is configured as one of a number of OFDM symbols, a time, and a number of SSBs.

3. A communication node transmitting a synchronization signal in a communication network, comprising a processor and a memory storing at least one instruction executed by the processor, wherein the at least one instruction is configured to:
    configure time offset information indicating a time location during which a first synchronization signal block (SSB) is transmitted, the time location indicating a location from a starting point of a frame in which the first SSB is transmitted;
    generate the first SSB including a primary synchronization signal (PSS), a secondary synchronization signal (SSS), and a physical broadcast channel (PBCH), the PBCH including the time offset information;
    generate one or more SSBs including the first SSB; and
    transmit the one or more SSBs according to the time offset information,
    wherein the at least one instruction is further configured to set the time offset information to be a common offset commonly applied to the one or more SSBs.

4. The communication node according to claim 3, wherein the at least one instruction is further configure to set the time offset information to be one of a number of OFDM symbols, a time, and a number of SSBs.

5. An operation method of a communication node receiving a synchronization signal in a communication network, the operation method comprising:
    receiving a first synchronization signal block (SSB) including a primary synchronization signal (PSS), a secondary synchronization signal (SSS), and a physical broadcast channel (PBCH), the PBCH including time offset information and the time offset information indicating a time location during which the first SSB is transmitted, the time location indicating a location from a starting point of a frame in which the first SSB is transmitted;

obtaining the time offset information from the PBCH included in the first SSB; and determining the time location during which the first SSB is transmitted, wherein the time offset information is configured as a common offset commonly applied to one or more SSBs including the first SSB.

6. The operation method according to claim 5, wherein the time offset information is configured as one of a number of OFDM symbols, a time, and a number of SSBs.

* * * * *